United States Patent
Matsubara

(10) Patent No.: US 6,235,382 B1
(45) Date of Patent: May 22, 2001

(54) CERMET TOOL AND PROCESS FOR PRODUCING THE SAME

(75) Inventor: Masaru Matsubara, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/282,197

(22) Filed: Mar. 31, 1999

(30) Foreign Application Priority Data

Mar. 31, 1998 (JP) .................................................. 10-105670

(51) Int. Cl.⁷ .............................. B32B 18/00; B32B 19/00
(52) U.S. Cl. ......................... 428/325; 428/332; 428/336; 428/698; 428/699
(58) Field of Search .................................. 428/332, 325, 428/336, 698, 697, 699

(56) References Cited

U.S. PATENT DOCUMENTS

| | | | | |
|---|---|---|---|---|
| 4,746,363 | * | 5/1988 | DeAngelis ............................... | 75/244 |
| 4,769,070 | * | 9/1988 | Tobioka et al. ......................... | 75/238 |
| 5,059,491 | | 10/1991 | Odani et al. ............................ | 419/29 |
| 5,110,543 | | 5/1992 | Odani et al. ............................ | 428/614 |
| 5,776,588 | * | 7/1998 | Moriguchi et al. ..................... | 428/210 |
| 5,945,167 | * | 8/1999 | Kuwabara et al. ..................... | 427/376.3 |
| 6,010,777 | * | 1/2000 | Ogimoto et al. ........................ | 428/325 |

FOREIGN PATENT DOCUMENTS

| | | |
|---|---|---|
| 5352212 | 5/1978 | (JP) . |
| 2131803 | 5/1990 | (JP) . |
| 4300103 | 10/1992 | (JP) . |
| 5098383 | 4/1993 | (JP) . |
| 6114609 | 4/1994 | (JP) . |
| 8174310 | 7/1996 | (JP) . |
| 9104943 | 4/1997 | (JP) . |
| 9300104 | 11/1997 | (JP) . |

* cited by examiner

Primary Examiner—Paul Thibodeau
Assistant Examiner—Monique R Jackson
(74) Attorney, Agent, or Firm—Dougherty & Troxell

(57) ABSTRACT

A cermet tool and process for making the same is disclosed. The cermet tool has a surface coating layer which exhibits a function equivalent to or higher than a hard coating layer of a conventional cermet tool. The tool is economical to produce since no additional step such as a gas phase film forming method is necessary for the formation of the surface coating layer. The surface coating layer has essentially the same hard phase composition as the interior main body part, but the weight content of the binder metallic phase metallic element component is smaller than the average weight content of the binder metallic phase metallic element component through out the cermet (or the weight content in the main body part). This surface coating layer is formed on the surface outermost part of the cermet body. Because the surface coating layer has a content of the binder metallic phase smaller than that in the main body part, it has a hardness higher than the main body part. As a result, the wear resistance of the tool is improved. Furthermore, the surface coating layer is formed by modifying the surface of the cermet itself without employing another step such as a gas phase film forming method.

15 Claims, 5 Drawing Sheets

MATERIAL TO BE CUT W

240mm

200mm (PLAN VIEW)

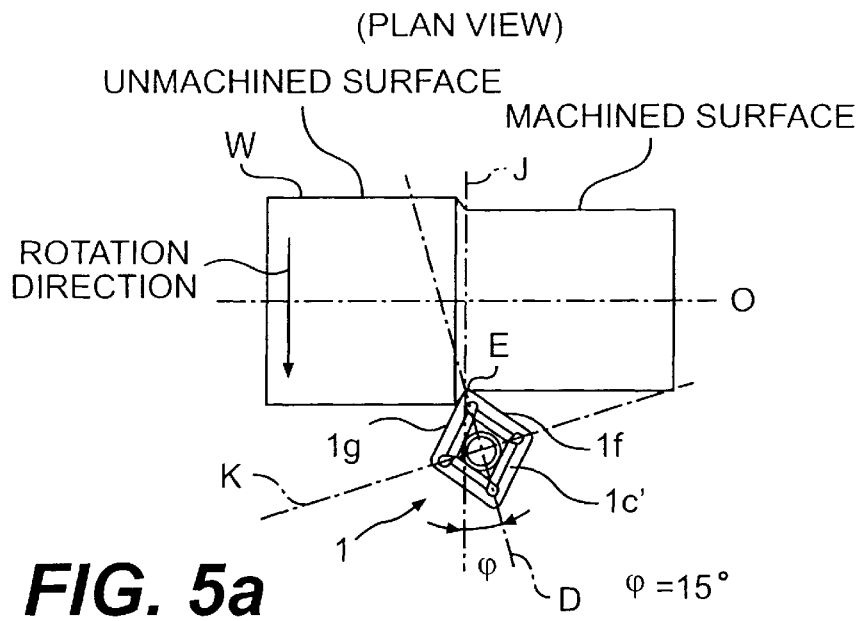

FIG. 5a

(LEFT SIDE VIEW)

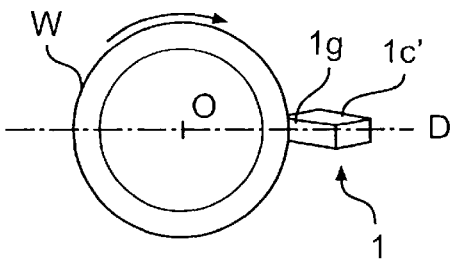

FIG. 5b

(FRONT VIEW)

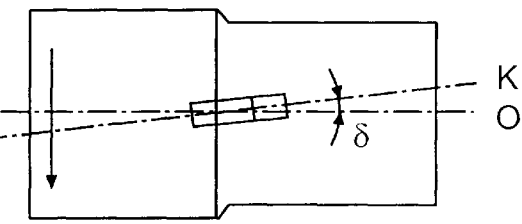

FIG. 5c  $\delta = 6°$

O: CENTRAL AXIS OF MATERIAL TO BE CUT W

D: STRAIGHT LINE PASSING THE CENTER IN THICKNESS DIRECTION OF TEST PIECE PARALLEL TO ONE DIAGONAL LINE OF PRIMARY PLANE LC' (CROSSING 0)

E: POINT OF SECTION OF D AND THE OUTER CIRCUMFERENTIAL SURFACE OF MATERIAL TO BE CUT W (CUTTING POINT BY TEST PIECE)

J: STRAIGHT LINE PASSING E PERPENDICULAR TO 0

K: STRAIGHT LINE PASSING THE CENTER IN THICKNESS DIRECTION OF TEST PIECE PARALLEL TO THE OTHER DIAGONAL LINE OF PRIMARY PLANE LC'

φ: CROSSING ANGLE BETWEEN J AND D

δ: TORSION ANGLE OF K WITH RESPECT TO 0

CERMET TOOL AND PROCESS FOR PRODUCING THE SAME

FIELD OF THE INVENTION

The present invention relates to a cermet tool and a process for producing the same.

BACKGROUND FOR THE INVENTION

A cermet sintered body, which comprises a hard phase mainly comprising a carbonitride of Ti and a 4a, 5a, 6a Group element component other than Ti (V, Cr, Zr, Nb, Mo, Hf, Ta and W), the hard phase being bound with a binder metallic phase mainly comprising Ni and/or Co is known. Such bodies have excellent plastic deformation resistance, etc. in comparison to super hard alloys which have also been conventionally used. Therefore the sintered bodies are replacing the super hard alloys as cutting tools. The cermet tool is often used in the form in which a hard coating layer of a carbide, a nitride or a carbonitride of Ti or alumina is formed on the surface, to further improve the wear resistance and the plastic deformation resistance.

The formation of a hard layer on the cermet tool described above has been conducted by a gas phase film formation method, such as a physical vapor deposition method, a chemical vapor deposition method, and the like. In this method, however, the hard layer is formed after firing the cermet by conducting another gas phase film forming method as another step. Furthermore, a pretreatment step such as surface polishing, a subsequent surface cleaning or modifying, etc. is necessary before the film formation. As a result, the number of steps is excessive, which leads to an increase in the price of the tool.

An object of the present invention is to provide a cermet tool having a surface coating layer which exhibits a function equivalent to or higher than a hard coating layer of a conventional cermet tool, and being economical in that steps such as a gas phase film forming step is not necessary. Another object of the invention is to provide a process for producing the same.

BRIEF SUMMARY OF THE INVENTION

In essence, the present invention contemplates a cermet tool which includes a binder metallic phase and a hard phase forming a cermet body and a surface coating layer formed on an outermost surface of the cermet body. The binder metallic phase mainly comprises Ni, or Ni and Co (hereinafter referred to as a binder metallic phase forming component). The hard phase contains, as a metallic element component of the phase (hereinafter referred to as a hard phase metallic element component), Ti constituting its main part, and one or more of an additional metallic element component M selected from V, Cr, Zr, Nb, Mo, Hf, Ta and W. The hard phase mainly comprises a carbonitride of the hard phase metallic element component.

A surface coating layer is formed on an outer surface of the cermet body. This surface coating layer mainly comprises the same materials as in the hard phase of the cermet body. However, the weight content of the binder metallic phase forming component is smaller than an average weight content of the binder metallic phase forming component throughout the cermet body. In addition, the weight content WB1 of the binder metallic phase forming component in the surface coating layer of the cermet body and a weight content WB2 of the binder metallic phase forming component of a residual part (hereinafter referred to as a main body part) other than the surface coating layer satisfy the following equation:

$$0.1 \leq WB1/WB2 \leq 0.7$$

In a preferred embodiment of the invention, a surface coating layer is formed on the surface outermost part of the cermet body. This surface coating layer mainly comprises the same elements as in the hard phase of the ceramic tool. However, the weight content of the binder metallic phase forming component in the surface coating is less than the average weight content of the binder metallic phase forming component throughout the cermet tool. Also the weight content WR1 of the hard phase metallic element component and a weight content WB1 of the binder metallic phase forming component in the surface coating layer of the cermet tool, and a weight content WR2 of the hard phase metallic element component and a weight content WB2 of the binder metallic phase forming component of a residual part (hereinafter referred to as a main body part) other than the surface coating layer satisfies the following equations:

$$0.005 \leq WB1/WR1 \leq 0.14$$

$$0.05 \leq WB2/WR2 \leq 0.2$$

The invention will now be described in connection with the accompanying figures.

BRIEF DESCRIPTION OF THE DRAWINGS

FIGS. 5, a, b and c are diagrams showing the relationship of the position of the test piece 1 and the material to be cut.

DETAILED DESCRIPTION OF THE PREFERRED EMBODIMENTS OF THE INVENTION

Figure 1:
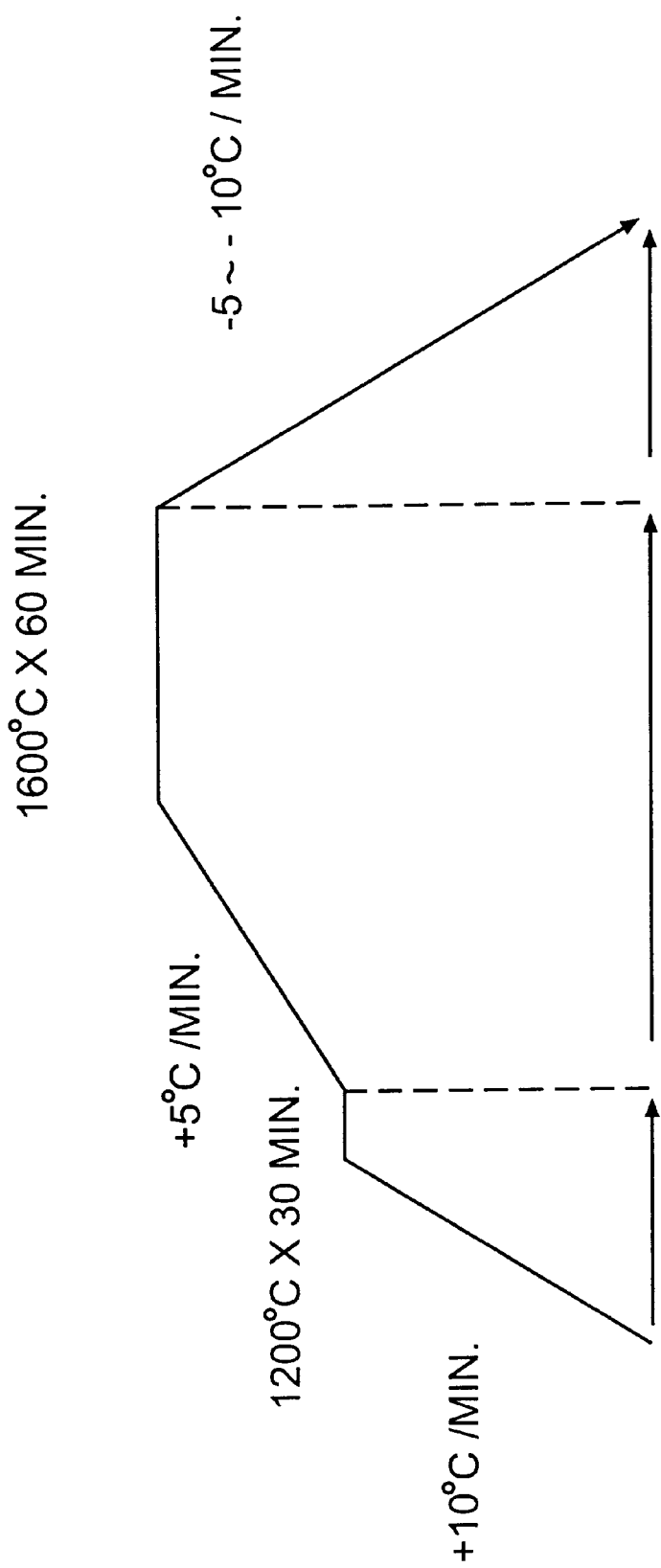
FIG. 1 is a diagram showing the sintering pattern of a cermet in accordance with the present invention.

In the cermet tool 2 of the present invention, a surface coating layer 3 is formed on a surface outermost part of a cermet body 4 and forms an important part of the tool 2. The surface coating layer 3 mainly comprising the same material as the hard phase as in the main body part, in which the weight content of the binder metallic phase forming component is smaller than an average weight content of the binder metallic phase forming component throughout the cermet body 4 ie the weight content in the main body part. In a first embodiment of the invention, a weight content WB1 of the binder metallic phase forming component in the surface coating layer of the cermet tool 1 (reflecting the amount of the binder metallic phase in the surface coating layer) and a weight content WB2 of the binder metallic phase forming component of the body 4 (reflecting the amount of the binder metallic phase in the main body part) is adjusted to be $0.1 \leq WB1/WB2 \leq 0.7$.

Since the surface coating layer 3 has a smaller content of the binder metallic phase than the body 4, its hardness becomes higher than the main body part. On the other hand, since a suitable amount of the binder metallic phase is present as converted to WB1/WB2 of 0.1 or more, dropping or spalling of the hard phase is unlikely, and excellent characteristics are exhibited for toughness. As a result, the wear resistance of the tool is improved. Furthermore, the surface coating layer described above has an advantage in that it can be easily formed by modifying the surface of the cermet body itself by the method described later. This is different from a so-called post-formation type that is formed by using a raw material not originated from the compositional component of the cermet by another step, such as the conventional formation of a hard coating layer by the gas phase film forming method.

When WB1/WB2 becomes less than 0.1, the binder metallic phase in the surface coating layer is insufficient. The result is that spalling of the hard phase is likely to occur, and the wear resistance of the tool is insufficient. On the other hand, when WB1/WB2 exceeds 0.7, the hardness of the surface coating layer is insufficient, and the wear resistance of the tool is insufficient. WB1/WB2 is more preferably adjusted in a range of from 0.2 to 0.5.

A second embodiment of the invention is viewed from the standpoint of the formation ratio of the hard phase and the binder metallic phase in both the surface coating layer 3 and the body 4. That is, in this composition, a weight content WR1 of the hard phase metallic element component (reflecting the amount of the hard phase in the surface coating layer) and a weight content WB1 of the binder metallic phase forming component in the surface coating layer of the cermet, and a weight content WR2 of the hard phase metallic element component (reflecting the amount of the hard phase in the main body part) and a weight content WB2 of the binder metallic phase forming component of a residual part (hereinafter referred to as a main body part other than the surface coating layer) are adjusted to be $0.005 \leq WB1/WR1 \leq 0.14$ in the side of the surface coating layer and $0.05 \leq WB2/WR2 \leq 0.2$ in the side of the main body part.

Since the surface coating layer has a smaller content of the binder metallic phase than the main body part, it has a higher hardness than the main body part. On the other hand, since a suitable amount of the binder metallic phase is present as converted to WB1/WR1 of 0.005 or more, spalling or dropping of the hard phase does not usually occur, and excellent characteristics are exhibited for toughness. As a result, the wear resistance of the tool is improved. Furthermore, the advantage in production is similar to that in the first embodiment.

When WB1/WR1 becomes less than 0.005 in the side of the surface coating layer, the binder metallic phase in the surface coating layer is insufficient to reduce or eliminate spalling of the hard phase, and the wear resistance of the tool becomes unsatisfactory. On the other hand, when WB1/WR1 exceeds 0.14, the amount of the binder metallic phase in the surface coating layer is excessive which reduces the hardness, and the wear resistance of the tool is unsatisfactory. WB1/WR1 is preferably adjusted in a range of from 0.01 to 0.11.

When WB2/WR2 is less than 0.05 the binder metallic phase is insufficient and makes the material weak, which leads to deterioration of the chipping resistance of the cermet tool. On the other hand, when WB2/WR1 exceeds 0.2, the amount of the hard phase is insufficient, and the wear resistance of the cermet tool is less than satisfactory. WB2/WR2 is preferably adjusted in a range of from 0.07 to 0.16.

In the composition of the second embodiment of the invention, when the ratio satisfies $0.1 \leq WB1/WB2 \leq 0.7$ (preferably $0.2 \leq WB1/WB2 \leq 0.5$) as similar to the first embodiment, the effect of increasing the wear resistance of the cermet is further realized.

In a third embodiment of the invention, a cermet tool as described in connection with the second embodiment of the invention satisfies the following equation:

$$0.1 \leq WB1/WB2 \leq 0.7$$

In a further embodiment of the invention, a cermet tool as described above also meets the criteria that the respective metallic element components constituting the hard phase metallic element component in the surface coating layer and the main body part exhibit content ratios substantially the same as each other.

A still further embodiment of the invention contemplates a cermet tool as described above, but wherein a thickness of the surface coating layer is adjusted to a range of from 0.5 to 5 μm.

An additional embodiment of the invention contemplates a cermet tool as defined above, wherein the surface coating layer has an appearance hue within a hue range of from 5PB to 5Y via 5RP on a hue circle defined in Japanese Industrial Standard JIS Z8721 which is incorporated herein in its entirety by reference. An English language translation of the Japanese Industrial Standard JIS Z8721 has been published by and is available from the Japanese Standards Association 1-24, Akasaka 4, Minato-ku, Tokyo 107, Japan. The JIS Z8721 is a color system wherein color notation and values are defined by number and alphabet. This system corresponds to the Munsell system. The surface coating exhibits a chromatic color having a lightness Vs of 6 or more and/or a saturation Cs of 4 or more, or a substantially achromatic color having a lightness Vs defined in JIS Z8721 of 6 or more.

Another embodiment of the invention contemplates a cermet tool as described above, wherein an appearance of the surface coating layer does not exhibit metallic gloss.

The invention also contemplates a process for producing a cermet tool which includes the following steps. The first step embodies a mixing operation to obtain a mixed powder by mixing a hard phase raw material powder containing, as a metallic element component, Ti as its main part, and one or more of an additional metallic element component M selected from V, Cr, Zr, Nb, Mo, Hf, Ta and W, and mainly comprising a carbonate, a nitride or a carbonitride of the metallic element component, with a binder metallic phase raw material powder comprising Ni, or Ni and Co.

The second step is to mold the mixed powder into a prescribed shape. The second step is followed by a firing step to fire a molded article at a firing temperature set within a range of from about 1,450 to about 1,650° C.

Then, the fired article is subjected to a cooling step wherein the molded article from the firing temperature is cooled and, wherein an average cooling rate at least in a temperature range of from 1,450 to 1,300° C. is from 7 to 50° C. per minute, and an atmosphere containing nitrogen and/or an inert gas in a partial pressure of 50 torr or more is used as a cooling atmosphere at least in the aforementioned temperature range.

The cermet tool according to the present invention can be easily produced by the following process. To be more specific, the process for production incorporates a mixed powder which is obtained by mixing the hard phase raw material powder and binder metallic phase raw material powder in prescribed amounts. This mixed powder is then molded into a prescribed shape. The resulting molded article is fired at a firing temperature set in a range of from 1,450 to 1,650° C. After firing, cooling is conducted, in which an average cooling rate at least in a temperature range of from 1,450 to 1,300° C. is from 7 to 50° C. per minute, and an atmosphere containing nitrogen and/or an inert gas (such as argon) in a partial pressure of 50 torr or more is used as a cooling atmosphere at least within the aforementioned temperature range. By firing the molded article, the hard phase is formed based on the hard phase raw material powder, and the binder metallic phase is formed based on the binder metallic phase raw material powder, thereby to form a cermet sintered body. By conducting the cooling after firing at the cooling rate in the atmosphere described above, the amount of the metallic binder metallic layer in the surface part of the cermet is decreased with the proportion of the hard phase being relatively increased, and it is modified by the surface coating layer described above.

As a mechanism for decreasing the binder metallic phase in the surface layer of the cermet by setting the cooling conditions to those described above produces the following results. That is, during firing, diffusion of the compositional elements of the metallic phase occurs from the central part of the article to be fired toward the outer periphery. On cooling after completion of sintering, by introducing nitrogen and/or an inert gas at a pressure higher than the prescribed value at the initial stage thereof, nitriding or carbonization of the hard phase particles is accelerated. This causes particle growth of the hard phase in the surface part, and wettability between the hard phase and the binder metallic phase is decreased. Therefore, a part of the binder metallic phase is likely to be flicked out or evaporated. As a result, it is believed that the binder metallic phase of the surface part is decreased.

According to the process described above, a tool of the present invention, in which a surface coating layer is formed on the surface of the cermet, can be easily produced by the surface modification of the cermet itself. Furthermore, because the surface modification is carried out on cooling after firing, a pretreatment such as surface polishing preceding the film formation is not necessary. As a result, the number of production steps of the tool can be effectively reduced, and the price of the tool can be lowered.

In the process described above, when the firing temperature exceeds 1,650° C., the growth of crystalline particles makes it difficult to ensure the necessary strength. On the other hand, when the firing temperature is less than 1,450° C., densification of the material is insufficient, which results in insufficient strength. Accordingly, the firing temperature is preferably within the range of from 1,500 to 1,650° C.

When the cooling rate in the temperature range of from 1,450 to 1,300° C. becomes less than 7° C. per minute, it leads to deterioration of the wear resistance of the tool. It is believed that this is because the content of the metallic phase in the surface coating layer becomes excessive. When it exceeds 50° C. per minute, defects such as cracks are likely to be formed in the sintered body due to a thermal impact on cooling. Therefore, the cooling rate is suitably from 7 to 50° C. per minute, and preferably from 10 to 30° C. per minute. The temperature range, at which the cooling rate is maintained, can be expanded to the higher temperature side than 1,450° C. (for example, to the firing temperature) or to the lower temperature side than 1,300° C.

When the partial pressure of nitrogen and/or an inert gas in the cooling atmosphere becomes less than 50 torr, the formation of the surface coating layer is insufficient, which leads to insufficient wear resistance of the tool. The partial pressure of nitrogen and/or an inert gas is more preferably 100 torr or more. Nitrogen and an inert gas each can be used singly or can be used as a mixture.

The weight content WR2 of the hard phase metallic element component and the weight content WB2 of the binder metallic phase forming component of the main body part of the cermet can be adjusted by the mixing ratio of the hard phase raw material powder and the binder metallic phase raw material powder. The weight content WR1 of the hard phase metallic element component and the weight content WB1 of the binder metallic phase forming component can be adjusted by the mixing ratio described above, and also by the pressure of the atmospheric gas and/or the cooling rate upon cooling after firing. For example, in the case where WB1 (i.e., the amount of the binder metallic phase) is to be decreased, rapid cooling is conducted in an atmosphere of a relatively high pressure. In the case where it is to be increased, the inverse procedure to the above can be employed.

In the cermet produced by the process described above, the surface coating layer is formed through modification of the surface layer part of the cermet, in which the binder metallic phase is decreased. In the case where only the composition of the hard phase is compared, the content ratios among the individual metallic element components constituting the hard phase metallic element components are substantially the same as each other between the surface coating layer and the main body part. That is, the surface coating layer contains the hard phase having the same composition as in the main body part in an amount larger than the main body part, and thus a good wear resistance can be ensured.

The thickness of the surface coating layer described above is suitably in the range of from 0.5 to 5 μm. When the thickness of the surface coating layer becomes less than 0.5 μm, the improvement in wear resistance by the formation of the surface coating layer is insufficient. On the other hand, when the thickness is larger than 5 μm, it leads to a problem in that piting occurs in the surface coating layer because the surface coating layer is brittle in comparison to the main body part. Therefore, the thickness of the surface coating layer is adjusted within the above-described range, preferably from 2 to 4 μm, and more preferably from 2.5 to 3 μm.

The content of the Ti component with respect to the total hard phase metallic component is preferably from 50 to 80% by weight. When the content of the Ti component is less than 50% by weight, it leads to deterioration of the plastic deformation resistance or the wear resistance of the cermet tool. On the other hand, if the content of the Ti component exceeds 80% by weight, the toughness of the cermet tool will be deteriorated. The content of the Ti component is more preferably within the range from 60 to 70% by weight.

The content of the additional metallic element component M (hereinafter referred to as an M component) is from 20 to 50% by weight. When the content of the M component exceeds 50% by weight, the Ti is decreased, which leads to the deterioration of plastic deformation resistance or wear resistance of the cermet tool. On the other hand, if the content of the M component becomes less than 20% by weight, the Ti component is increased, and the toughness of the cermet is reduced. Therefore, the content of the M component is preferably within about 30 to 40% by weight.

In order that the Ti component and the M component described above are effectively incorporated as compositional elements of the carbonitride phase, the content of the C or carbon component in the cermet is suitably from 7 to 12% by weight, and preferably from 8 to 10% by weight. For the same reason, the content of the N or Nitrogen component in the cermet is from 3 to 8% by weight, and preferably from 5 to 6% by weight. Furthermore, assuming that the content of the C component in the cermet is represented by x, and the content of the N component is represented by y, the value of y/(x+y) should be adjusted to within the range of more than 0.3 but less than 0.5.

In the cermet tool described above, a worn corner part generally exhibits a relatively dark hue, specifically a hue having a lightness Vs of 4 or less and a saturation Cs of 3 or less defined in JIS Z8721. In this case, the surface coating layer has an appearance hue within a hue range of from 5PB to 5Y via 5RP on a hue circle defined in JIS Z8721, and exhibits a chromatic color having a lightness Vs of 6 or more and/or a saturation Cs of 4 or more, or a substantially achromatic color having a lightness Vs defined in JIS Z8721 of 6 or more. Therefore, the worn corner part and the surface coating layer can be easily distinguished with the naked eyes based on the difference in lightness or saturation between them. As a result, distinction of a worn tool, confirmation of the life of the tool, and the like can be easily conducted. The "substantially achromatic color" used herein means a color having a saturation Cs of 1 or less defined in JIS Z8721.

When the lightness Vs of the appearance of the surface coating layer becomes less than 6, distinction between the exposed main body part and the surface coating layer becomes difficult. The lightness Vs of the appearance of the surface coating layer is preferably in the range of 7 or more. On the other hand, when the lightness Vs of the appearance of the surface coating layer exceeds 8, the content of the binder metallic phase metallic component in the surface coating layer becomes excessive, and the wear resistance deteriorates. Thus, the lightness Vs is preferably 8 or less.

In this case, the hue of the surface coating layer may be a chromatic color having a saturation of 1 or more. This is accomplished by adjusting the formation conditions of the surface coating layer (provided that the saturation Cs may be as large as the maximum value (14) defined in JIS). According to this, confirmation by the naked eyes of wear of the tool can be easily conducted. Even when the lightness of the surface coating layer is substantially the same as that of the spent corner part, since the saturation Cs of the spent corner part is 3 or less, the distinction can be made by the saturation Cs of the surface coating layer of 4 or more.

In the case where the surface coating layer is formed by modifying the surface part of the cermet according to the process for production of the present invention, when the hue thereof is a chromatic color outside the hue range described above, the surface coating layer often does not have sufficient wear resistance. Therefore, the appearance hue of the surface coating layer is preferably within the hue range described above, and is more preferably within the hue range from 5PB to 5Y through 5PR. In other words, it can be judged as to whether or not a normal surface coating layer is formed, by measuring the hue of the surface coating layer, based on the judgement whether or not the lightness or hue thereof is in the range described above.

In this case, it is preferred that the appearance of the surface coating layer substantially does not exhibit metallic gloss. When the surface coating layer has an appearance exhibiting metallic gloss, the content of the binder metallic phase metallic component in the surface coating layer becomes excessive, and the wear resistance is reduced, although the distinction by the naked eyes is easy.

By subjecting the surface of the cermet after firing to an acid treatment, the surface coating layer can be modified. The appearance hue of the surface coating layer, can be adjusted (for example, increasing the saturation) so that a spent corner can be easily distinguished. Examples of the acid that can be used include hydrochloric acid, nitric acid, aqua regia (for example, a mixture of nitric acid and hydrochloric acid with a volume mixing ratio of nitric acid/hydrochloric acid=about 1/3) and the like.

The cermet tools of the present invention are described with reference to the following examples.

Raw material powders used in the example include a titanium carbonitride powder having an average particle diameter of 1.5 μm (titanium carbide/titanium nitride=50/50), titanium carbide powder having an average particle diameter of 1.0 μm, titanium nitride powder having an average diameter of 1.4 μm, niobium carbide powder having an average diameter of 1.4 μm, tantalum carbide powder having an average diameter of 1.6 μm, molybdenum carbide ($Mo_2C$) powder having an average diameter of 3.3 μm, tungsten carbide powder having an average diameter of 1.6 μm, nickel powder having an average diameter of 3.0 μm, and cobalt powder having an average diameter of 1.5 μm. The above raw material powders were blended to have the component ratios A and B shown in Table 1, and mixed in a ball mill for 72 hours with acetone as a solvent. After the mixed powder was dried, it was subjected to kneading with the addition of a microwax series binder and drying, to make granuled powder by passing through a 60 mesh sieve. The granuled powder was then molded into a prescribed shape of a tool by press molding with a pressure of 1.5 ton/cm$^2$, followed by being degreased (Table 3: Samples Nos. 1 to 6, provided that Nos. 5 and 6 were outside the scope of the invention).

The molded articles were installed in a firing furnace, and heated from room temperature to 1,200° C. at an average temperature gradient of 10° C. per minute, and maintained at 1,200° C. for 30 minutes for degassing, as shown in FIG. 1. During this period, the interior of the firing furnace was maintained in a nitrogen atmosphere at a partial pressure of 100 torr or less. Thereafter, a prescribed partial pressure of nitrogen or argon was introduced into the furnace to make the sintering atmospheres shown in Table 2, and the temperature was increased at a temperature increasing rate of 5° C. per minute, followed by maintaining at a firing temperature (maximum temperature of 1,600° C.) for 1 hour. After completing the firing and maintenance, a prescribed partial pressure of nitrogen or argon was introduced into the furnace to make the cooling atmospheres shown in Table 2, and cooling was conducted in such a manner that the average cooling rate to 1,300° C. were the values shown in Table 2, so as to produce a cermet sintered body.

After completing cutting performance tests described below of the cermet sintered bodies described above, the center part thereof was cut, and the cut surface was mirror polished. Then, the thickness and the composition of the surface coating layer and the composition of the main body part were measured with an EPMA (electron probe microanalyzer by an energy dispersion type X-ray spectroscopy method) of an SEM (scanning electron microscope) in the following manner. With respect to the thickness of the surface coating layer, the cut surface of the sintered body was observed with an SEM as a secondary electron beam image (magnification: 5,000), and it was measured from the resulting structural photograph. That is, in the secondary electron beam image, because the main body part containing a large amount of binder metallic phase having a high conductivity appeared brighter than the surface coating layer containing a small amount of the binder metallic phase, the boundary therebetween could be defined by the contrast thereof.

On the other hand, the composition of the main body part was defined in the following manner. The center of the cut surface was enlarged by an SEM at a magnification of 5,000, and simultaneously an analysis region having a height of 30 $\mu$m and a width of 40 $\mu$m was set within the range of view. The characteristic X-ray intensity was measured with scanning an electron beam within that region, to determine the composition from the intensity ratio. Three of the analysis regions were set in different ranges of view, respectively, and an average of the composition values obtained from the three regions was finally designated as the objective composition value. On the other hand, the composition of the surface coating layer was similarly determined in such a manner that the cut surface was enlarged by an SEM at a magnification of 5,000. An electron beam probe having a diameter of 1 $\mu$m was irradiated in the range of view to measure the characteristic X-ray intensity for the respective components, and the composition was determined from the intensity ratio (in this case, the composition was calculated as an average value of the three locations). The results of measurement are shown in Table 3.

The values WB1, WR1, WB2, WR2, WB1/WB2, WB1/WR1 and WB2/WR2 calculated from those measurement results are shown in Table 4. Furthermore, the contents of the C and N components measured by conducting gas analysis for the respective cermet sintered bodies, and the value y/(x+y) described above are also shown in Table 4.

Figure 2:
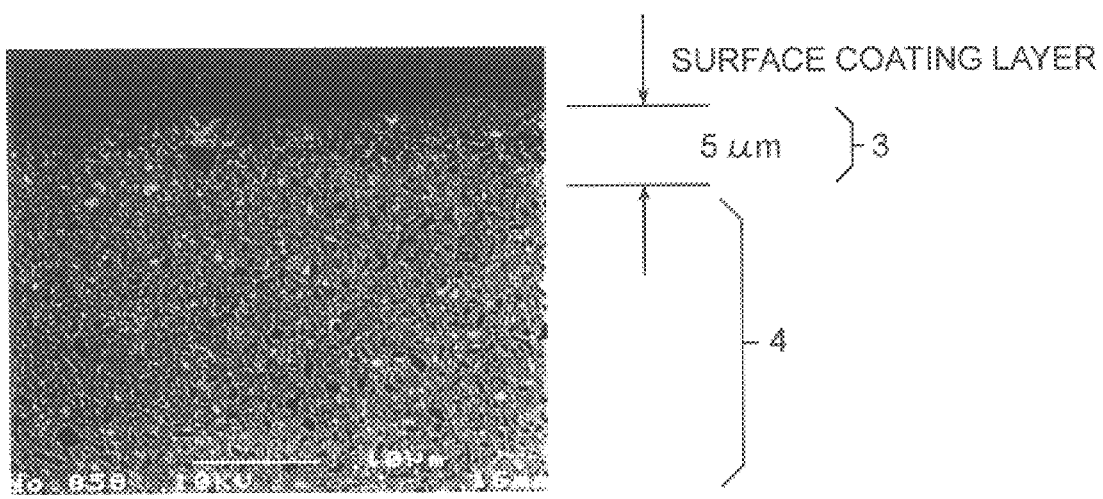
FIG. 2 is an SEM photograph showing the structure of a cermet sintered body of Sample No. 1 in the example of the invention.

FIG. 2 is a scanning electron micrograph of the sintered body of Sample No. 1 (magnification: 5,000). The part of a depth of about 5 $\mu$m from the surface is a part that is specified as the surface coating layer 3 by the measurement described above.

The appearance hue or color of the surface coating layer of the sintered body was determined by comparing with color samples, the hue, lightness and saturation of which had been known, by the naked eyes, so as to determine the appearance hue, lightness and saturation defined in JIS described above. The results are shown in Table 5.

Figure 3A:
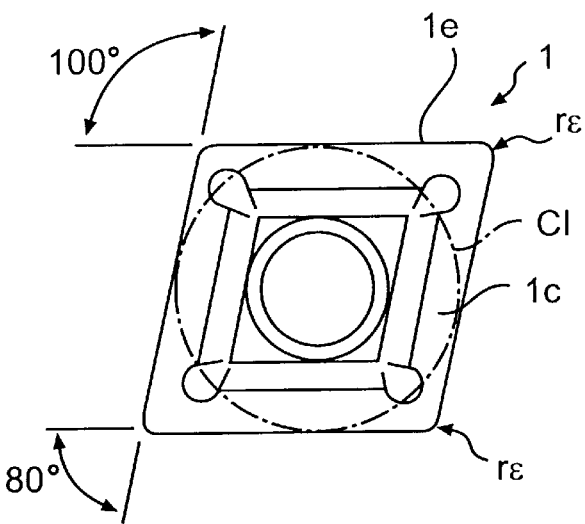
FIGS. 3a, b and c are a plan view and a side view of a cermet tool used in the example, and an enlarged side view of an edge part thereof.
Figure 3B:
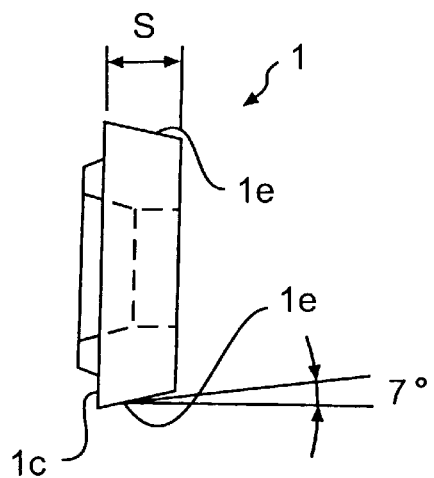
Figure 3C:
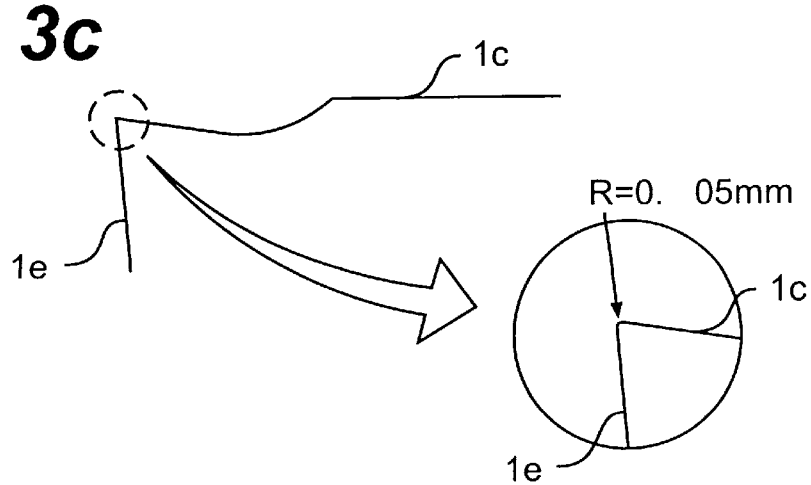

A test for evaluation of cutting performance when the cermets are used as a tools were conducted in the following manner. The shape of the sintered body (hereinafter referred to as a tool) was that shown in FIG. 3 (which is defined in ISO Standard as CCMT060204EN). The tool No. 1 had a thickness S of about 2.38 mm, a diameter of an inscribed circle $C_I$ of about 6.35 mm, and a flat shape of an approximate parallelogram cross section, and the size re of radius provided at the respective corners was about 0.4 mm. The beveling part (honing) provided at the edge part 1k was formed to have the honing (R=0.05 mm) with respect to the primary plane 1c.

Figure 4A:
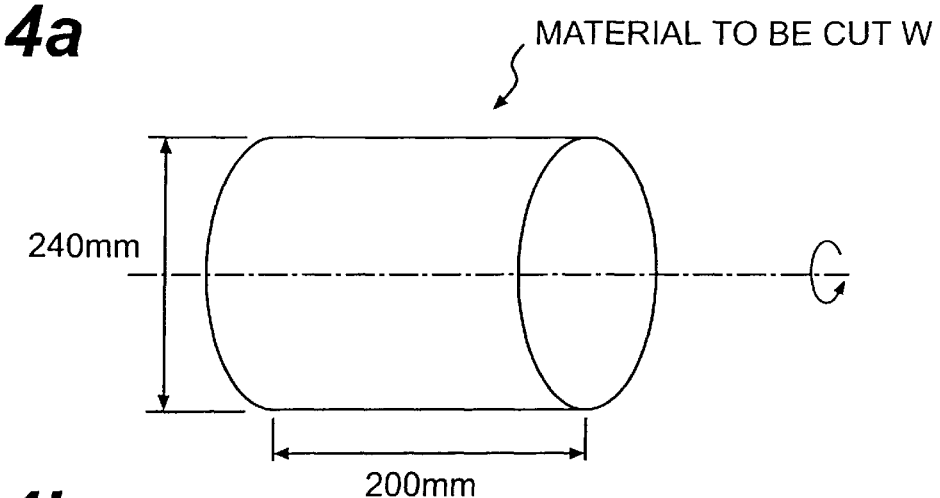
FIGS. 4, a, b and c are diagrams showing the summary of the cutting test.
Figure 4B:
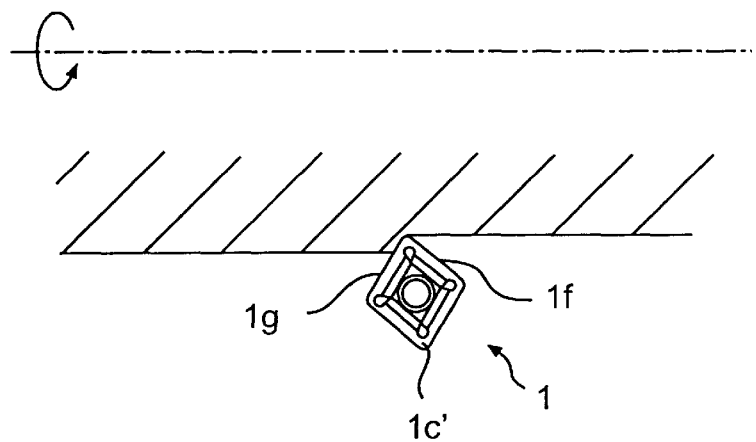

The evaluation conditions for the cutting performance of the tools are as follows. A material to be cut W in the form of a rod was rotated around an axis as shown in FIG. 4(a), the tool 1 shown in FIG. 3 was brought into contact with the outer circumferential surface thereof as shown in FIG. 4(b), one of the primary plane 1c was used as a rake face (hereinafter the rake face is denoted by 1c'), and the side plane 1e (FIG. 3) was used as a flank face, so that the outer circumferential surface of the material to be cut W was continuously cut under the following conditions.

Material to be cut: Mn steel for machine structure (SNCM439) having a round rod shape (outer diameter: 240 mm, length: 200 mm, hardness: HB300)

| | |
|---|---|
| Cutting speed V | 300 m/min |
| Feed f | 0.1 mm per rotation |
| Depth of cut d | 1.5 mm |
| Cutting oil | none |
| Cutting time | 4 minutes |

Figure 4C:
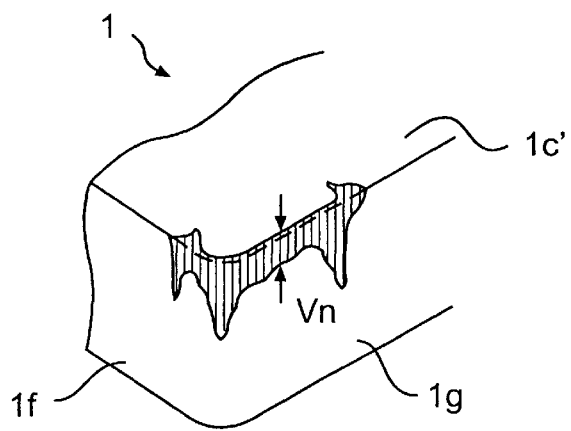

The relationship of the positions of the test piece 1 and the material to be cut W was as shown in FIG. 5. In this figure, symbol 1g denotes a side flank face, and 1f denotes a front flank face. The meanings of the other symbols are shown in the figure. After completing the cutting, the wear amount Vn of the flank face at the tip of the tool 1 (the wear height in the cutting direction on the side of the side flank face 1g, see FIG. 4(c)) was measured. The results are shown in Table 5. Accordingly, it is understood that the cermet tools within the scope of the invention (Sample Nos. 1 to 4) exhibit good wear resistance. The distinction of a spent corner part was easily conducted by the appearance hue.

While the invention has been described in connection with its preferred embodiments, it should be recognized that changes and modifications can be made therein without departing from the scope of the appended claims.

TABLE 1

| | Component | | | | | | | | |
|---|---|---|---|---|---|---|---|---|---|
| Kind | TiC | TiN | TiCN | NbC | TaC | WC | Mo$_2$C | Ni | Co |
| A | 34.5 | 22.5 | — | 4.5 | — | 18 | 8.5 | 4 | 8 |
| B | — | — | 57 | — | 4.5 | 16.5 | 7 | 5 | 10 |

(unit: percent by weight)

TABLE 2

| | Temperature increasing atmosphere until 1,200° C. | Sintering atmosphere | Sintering temperature (° C.) | Cooling atmosphere | Average cooling rate until 1,300° C. (° C. per minute) | Mixture composition |
|---|---|---|---|---|---|---|
| 1 | vacuum (2 × 10$^{-2}$ torr) | 1 torr N$_2$ | 1,600 | 650 torr N$_2$ | 10 | A |
| 2 | vacuum (2 × 10$^{-2}$ torr) | 260 torr Ar | 1,600 | 100 torr N$_2$ | 10 | A |
| 3 | 1 torr N$_2$ | 260 torr Ar | 1,600 | 650 torr N$_2$ | 10 | B |
| 4 | 10 torr N$_2$ | 260 torr Ar | 1,600 | 260 torr N$_2$ | 10 | B |
| 5 | 1 torr N$_2$ | 260 torr Ar | 1,600 | 650 torr N$_2$ | 10 | A |
| 6 | 1 torr N$_2$ | 260 torr Ar | 1,600 | 750 torr N$_2$ | 5 | B |

TABLE 3

| Mixture composition | | Surface coating layer composition (wt %) | | | | | | | |
|---|---|---|---|---|---|---|---|---|---|
| | | Ti | Nb + Ta | W | Mo | WR1 | Ni | Co | WB1 |
| 1 | A | 59.9 | 5.3 | 22.5 | 10.6 | 98.3 | 0.6 | 1.1 | 1.7 |
| 2 | A | 56.8 | 5.1 | 21.3 | 10.1 | 93.3 | 2.2 | 4.5 | 6.7 |
| 3 | B | 60.9 | 5.7 | 21.0 | 9.0 | 96.6 | 1.1 | 2.3 | 3.4 |
| 4 | B | 55.6 | 5.2 | 19.2 | 8.2 | 88.1 | 4.0 | 7.9 | 11.9 |
| 5 | A | 54.7 | 4.9 | 20.5 | 9.7 | 89.8 | 3.4 | 6.8 | 10.2 |
| 6 | B | 62.3 | 5.8 | 21.5 | 9.2 | 98.8 | 0.4 | 0.8 | 1.2 |

| Mixture composition | | Main body part composition (wt %) | | | | | | | |
|---|---|---|---|---|---|---|---|---|---|
| | | Ti | Nb + Ta | W | Mo | WR2 | Ni | Co | WB2 |
| 1 | A | 52.4 | 4.7 | 19.7 | 9.3 | 86.1 | 4.7 | 9.3 | 14.0 |
| 2 | A | 52.7 | 4.7 | 19.8 | 9.4 | 86.6 | 4.5 | 8.9 | 13.4 |
| 3 | B | 52.5 | 4.9 | 18.1 | 7.7 | 83.2 | 5.6 | 11.2 | 16.8 |
| 4 | B | 52.3 | 4.9 | 18.1 | 7.7 | 83.0 | 5.7 | 11.3 | 17.0 |
| 5 | A | 52.4 | 4.7 | 19.7 | 9.3 | 86.1 | 4.7 | 9.3 | 14.0 |
| 6 | B | 52.1 | 4.9 | 18.0 | 7.7 | 82.6 | 5.8 | 11.6 | 17.4 |

TABLE 4

| | Thickness of surface coating layer ($\mu$m) | WB1 (wt %) | WB2 (wt %) | WR1 (wt %) | WR2 (wt %) | WB1/WB2 | WB1/WR1 | WB2/WR2 | C (wt %) | N (wt %) | y/(x + y) |
|---|---|---|---|---|---|---|---|---|---|---|---|
| 1 | 5 | 1.7 | 14.0 | 98.3 | 86.0 | 0.12 | 0.017 | 0.16 | 9.0 | 5.1 | 0.36 |
| 2 | 2 | 6.8 | 13.5 | 93.2 | 86.5 | 0.50 | 0.07 | 0.16 | 9.0 | 5.1 | 0.36 |
| 3 | 3 | 3.4 | 16.8 | 96.6 | 83.2 | 0.20 | 0.035 | 0.20 | 7.7 | 6.1 | 0.44 |
| 4 | 2 | 11.9 | 17.0 | 88.1 | 83.0 | 0.70 | 0.14 | 0.20 | 7.7 | 6.1 | 0.44 |
| 5* | 2 | 10.2 | 14.0 | 89.8 | 86.0 | 0.73 | 0.11 | 0.16 | 9.0 | 5.1 | 0.36 |
| 6* | 5 | 1.2 | 17.4 | 98.8 | 82.6 | 0.07 | 0.012 | 0.21 | 7.7 | 6.1 | 0.44 |

TABLE 5

| | Appearance hue | | | | |
|---|---|---|---|---|---|
| | Hue | Lightness (V) | Saturation (C) | Wear amount (mm) | Note |
| 1 | 5Y | 8 | 14 | 0.13 | — |
| 2 | 5Y | 7 | 12 | 0.1 | — |
| 3 | 5Y | 6 | 10 | 0.08 | — |
| 4 | — | 7 | N | 0.24 | — |
| 5 | — | 9 | N | 0.23 | Metallic gloss Occurrence of fusion |
| 6 | 5Y | 5 | 8 | x | Pitching |

N under saturation refers to neutral or achromatic ie without color such as gray.

What is claimed:

1. A cermet tool comprising a cermet body including,
a binder metallic phase forming component of Ni, or Ni and Co, and
a hard phase including a hard phase metallic element component comprising, Ti as its main part, and one or more of an additional metallic element component M selected from the group consisting of V, Cr, Zr, Nb, Mo, Hf, Ta and W, and said hard phase comprising a carbonitride of said hard phase metallic element component,
a surface coating layer formed on a surface outermost part of said cermet body, said surface coating layer comprising a hard phase and a binder metallic phase component of Ni or Ni and Co and including the same elements as in said hard phase of said cermet body and in which a weight content of said binder metallic phase forming component in said surface coating layer is smaller than an average weight content of said binder metallic phase forming component throughout said cermet body; and a weight content of WB1 of said binder metallic phase forming component in said surface coating layer of said cermet and a weight content of WB2 of said binder metallic phase forming component of a residual part of said cermet body other than said surface coating layer satisfying $$0.1 \leq WB1/WB2 \leq 0.7.$$

2. A cermet tool comprising as its structure,
a binder metallic phase mainly comprising Ni, or Ni and Co as a binder metallic phase forming component, and
a hard phase containing, as a metallic element component of said phase Ti constituting its main part and one or more of an additional metallic element component M selected from the group consisting of V, Cr, Zr, Nb, Mo, Hf, Ta and W, and said hard phase comprising a carbonitride of said hard phase metallic element component,
a surface coating layer being formed on a surface outermost part of said cermet tool, said surface coating layer comprising a hard phase and a binder metallic phase component of Ni or Ni and Co and including the same elements as in said hard phase, in which a weight content of said binder metallic phase forming component is smaller than an average weight content of said binder metallic phase forming component throughout said cermet tool; and a weight content WR1 of said hard phase metallic element component and a weight content WB1 of said binder metallic phase forming component in said surface coating layer of said cermet, and a weight content WR2 of said hard phase metallic element component and a weight content WB2 of said binder metallic phase forming component of a residual part of said cermet tool other than said surface coating layer satisfying $0.005 \leq WB1/WR1 \leq 0.14$ $0.05 \leq WB2/WR2 \leq 0.2$.

3. A cermet tool as claimed in claim 2, which satisfies $0.1 \leq WB1/WB2 \leq 0.7$.

4. A cermet tool as claimed in claim 1, wherein said respective metallic element components constituting said hard phase metallic element component in said surface coating layer and said main body part exhibit content ratios substantially the same as each other.

5. A cermet tool as claimed in claim 2, wherein said respective metallic element components constituting said hard phase metallic element component in said surface coating layer and said main body part exhibit content ratios substantially the same as each other.

6. A cermet tool as claimed in claim 3, wherein said respective metallic element components constituting said hard phase metallic element component in said surface coating layer and said main body part exhibit content ratios substantially the same as each other.

7. A cermet tool as claimed in claim 1, wherein a thickness of said surface coating layer is adjusted to a range of from 0.5 to 5 µm.

8. A cermet tool as claimed in claim 2, wherein a thickness of said surface coating layer is adjusted to a range of from 0.5 to 5 µm.

9. A cermet tool as claimed in claim 3, wherein a thickness of said surface coating layer is adjusted to a range of from 0.5 to 5 µm.

10. A cermet tool as claimed in claim 4, wherein a thickness of said surface coating layer is adjusted to a range of from 0.5 to 5 µm.

11. A cermet tool as claimed in claim 1, wherein said surface coating layer has an appearance hue within a hue range of from 5PB to 5Y via 5RP on a hue circle defined in JIS Z8721, and exhibits a chromatic color having a lightness Vs of 6 or more and/or a saturation Cs of 4 or more, or a substantially achromatic color having a lightness Vs defined in JIS Z8721 of 6 or more.

12. A cermet tool as claimed in claim 2, wherein said surface coating layer has an appearance hue within a hue range of from 5PB to 5Y via 5RP on a hue circle defined in JIS Z8721, and exhibits a chromatic color having a lightness Vs of 6 or more and/or a saturation Cs of 4 or more, or a substantially achromatic color having a lightness Vs defined in JIS Z8721 of 6 or more.

13. A cermet tool as claimed in claim 3, wherein said surface coating layer has an appearance hue within a hue range of from 5PB to 5Y via 5RP on a hue circle defined in JIS Z8721, and exhibits a chromatic color having a lightness Vs of 6 or more and/or a saturation Cs of 4 or more, or a substantially achromatic color having a lightness Vs defined in JIS Z8721 of 6 or more.

14. A cermet tool as claimed in claim 4, wherein said surface coating layer has an appearance hue within a hue range of from 5PB to 5Y via 5RP on a hue circle defined in JIS Z8721, and exhibits a chromatic color having a lightness Vs of 6 or more and/or a saturation Cs of 4 or more, or a substantially achromatic color having a lightness Vs defined in JIS Z8721 of 6 or more.

15. A cermet tool as claimed in claim 5, wherein said surface coating layer has an appearance hue within a hue range of from 5PB to 5Y via 5RP on a hue circle defined in JIS Z8721, and exhibits a chromatic color having a lightness Vs of 6 or more and/or a saturation Cs of 4 or more, or a substantially achromatic color having a lightness Vs defined in JIS Z8721 of 6 or more.

* * * * *